US012197973B2

United States Patent
He et al.

(10) Patent No.: US 12,197,973 B2
(45) Date of Patent: Jan. 14, 2025

(54) MESSAGE ENCODING AND DECODING METHODS, PROCESSING DEVICE, AND STORAGE MEDIUM

(71) Applicant: Suzhou China Star Optoelectronics Technology Co., Ltd., Jiangsu (CN)

(72) Inventors: Lulu He, Jiangsu (CN); Wenbing Zhang, Jiangsu (CN); Feng Gao, Jiangsu (CN)

(73) Assignee: Suzhou China Star Optoelectronics Technology Co., Ltd., Suzhou (CN)

( * ) Notice: Subject to any disclaimer, the term of this patent is extended or adjusted under 35 U.S.C. 154(b) by 0 days.

(21) Appl. No.: 17/796,652

(22) PCT Filed: Jul. 29, 2022

(86) PCT No.: PCT/CN2022/108884
§ 371 (c)(1),
(2) Date: Jul. 31, 2022

(87) PCT Pub. No.: WO2024/011669
PCT Pub. Date: Jan. 18, 2024

(65) Prior Publication Data
US 2024/0184648 A1 Jun. 6, 2024

(30) Foreign Application Priority Data
Jul. 13, 2022 (CN) .......................... 202210828371.3

(51) Int. Cl.
*G06F 9/54* (2006.01)
*H04L 69/06* (2022.01)
(52) U.S. Cl.
CPC .............. *G06F 9/546* (2013.01); *H04L 69/06* (2013.01)

(58) Field of Classification Search
None
See application file for complete search history.

(56) References Cited

U.S. PATENT DOCUMENTS 11,200,331 B1 * 12/2021 Bouaichi ............... H04L 9/0897
2021/0064450 A1    3/2021 Nugent et al.
(Continued)

FOREIGN PATENT DOCUMENTS

CN        101076983       11/2007
CN        103200430        7/2013
(Continued)

OTHER PUBLICATIONS

International Search Report and the Written Opinion Dated Dec. 16, 2022 from the International Searching Authority Re. Application No. PCT/CN2022/108884 and its Translation into English. (17 Pages).

(Continued)

*Primary Examiner* — Craig C Dorais

(57) ABSTRACT

Message encoding and decoding methods, a processing device, and a storage medium are disclosed. The method includes generating a request message, wherein the request message includes an attribute message and a content message, the attribute message includes a message identifier, a message direction, a message timeout state, a message processing state, and a message termination state, the content message includes at least a first type of content message and a second type of content message, and the attribute message is used to process the request message; and sending at least the content message and the message direction.

17 Claims, 10 Drawing Sheets

(56) References Cited

U.S. PATENT DOCUMENTS

2023/0054780 A1* 2/2023 Boulineau ............. G06F 11/263
2023/0134327 A1* 5/2023 Hippenstiel ............. G06F 9/546
                                                        709/223

FOREIGN PATENT DOCUMENTS

| CN | 104796434 | 7/2015 |
| CN | 105100002 | 11/2015 |
| CN | 106899511 | 6/2017 |
| CN | 109462634 | 3/2019 |
| CN | 110247838 | 9/2019 |
| CN | 112527530 | 3/2021 |
| CN | 112596920 | 4/2021 |
| CN | 114637615 | 6/2022 |
| WO | WO 98/30962 | 7/1998 |

OTHER PUBLICATIONS

Notification of Office Action and Search Report Dated Oct. 12, 2023 From the State Intellectual Property Office of the People's Republic of China Re. Application No. 202210828371.3 and its Translation into English. (15 Pages).

* cited by examiner

MESSAGE ENCODING AND DECODING METHODS, PROCESSING DEVICE, AND STORAGE MEDIUM

RELATED APPLICATIONS

This application is a National Phase of PCT Patent Application No. PCT/CN2022/108884 having International filing date of Jul. 29, 2022, which claims the benefit of priority of Chinese Patent Application No. 202210828371.3 filed on Jul. 13, 2022. The contents of the above applications are all incorporated by reference as if fully set forth herein in their entirety.

FIELD AND BACKGROUND OF THE INVENTION

The present application relates to the technical field of communication technologies, and more particularly, to message encoding and decoding methods, a processing device, and a storage medium.

With the continuous increase in the demand of the semiconductor manufacturing industry, requirements for the degree of automation of semiconductor equipment are getting higher and higher.

At present, there are message interactions of different contents and forms between different semiconductor devices, between different units of the same device, and between different functional software of the same unit. During the production process of the product, if there are frequent abnormal message exchanges between devices, it may lead to shutdown of the equipment and the production line or cause unsafe events such as temperature control exceeding the standard and equipment collision.

Therefore, there is an issue of frequent abnormal message interaction between existing devices, which needs to be improved urgently.

SUMMARY OF THE INVENTION

Technical Problem

Embodiments of the present application provide a message encoding method, a message decoding method, a message processing device, and a storage medium, so as to solve the issue of frequent abnormal message interaction between devices.

Technical Solution

Embodiments of the present application provide a message encoding method including:
generating a request message, wherein the request message comprises an attribute message and a content message, the attribute message comprises a message identifier, a message direction, a message timeout state, a message processing state, and a message termination state, the content message comprises at least a first type of content message and a second type of content message, and the attribute message is used to process the request message; and
sending at least the content message and the message direction in the request message.

Beneficial Effect

The present application provides message encoding and decoding methods, processing device and a storage media including generating a request message, wherein the request message comprises an attribute message and a content message, the attribute message comprises a message identifier, a message direction, a message timeout state, a message processing state, and a message termination state, the content message comprises at least a first type of content message and a second type of content message, and the attribute message is used to process the request message; and sending at least the content message and the message direction in the request message. The request message in this application may include at least two different types of content messages. That is, two different types of content messages can be sent at one time. In addition, the attribute message in the request message can be used as the basis for processing the request message, which standardizes the way of processing the request message. Therefore, the message processing method of the present application can consider diversity and stability of the communication content form.

BRIEF DESCRIPTION OF THE SEVERAL VIEWS OF THE DRAWINGS

The present application will be further described below with reference to the accompanying drawings. It should be noted that the accompanying drawings in the following description are only used to illustrate some embodiments of the present application. For those skilled in the art, other drawings can also be obtained from these drawings without creative effort.

DESCRIPTION OF SPECIFIC EMBODIMENTS OF THE INVENTION

Figure 1:
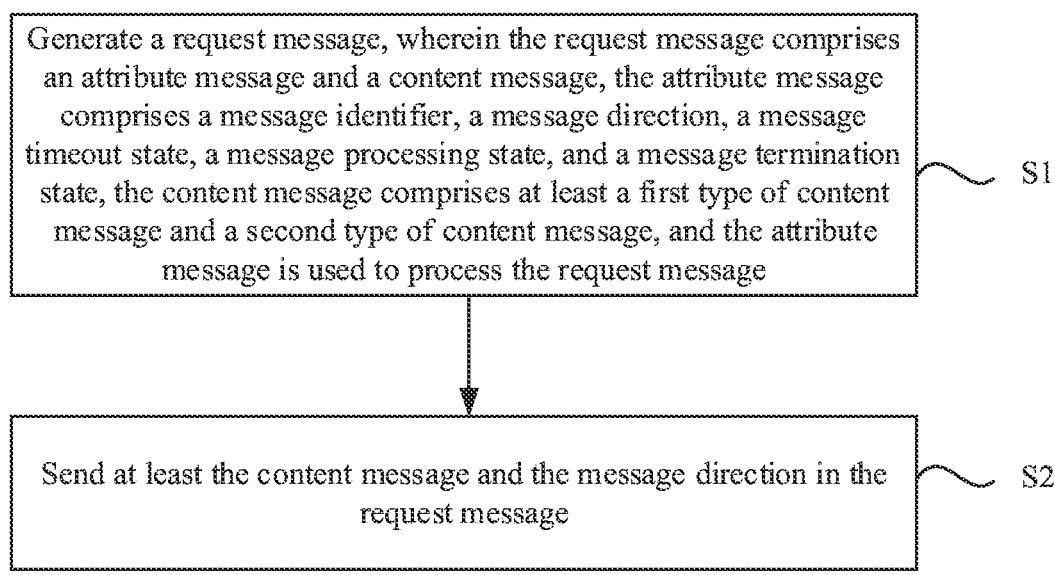
FIG. 1 to FIG. 10 are respectively flowcharts of ten message processing methods provided by embodiments of the present application.

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in this application, all other embodiments obtained by those skilled in the art without creative efforts shall fall within the protection scope of this application.

The terms "first", "second", etc. in this application are used to distinguish different objects, rather than to describe a specific order. Furthermore, the terms "comprising" and "having" and any variations thereof are intended to cover non-exclusive inclusion. For example, a process, method, system, product, or device comprising a series of steps or modules is not limited to the listed steps or modules. Rather, it optionally also includes steps or modules not listed. Rather, it optionally also include other steps or modules inherent to these processes, methods, products or devices.

Reference herein to an "embodiment" means that a particular feature, structure, or characteristic described in connection with the embodiment can be included in at least one embodiment of the present application. The appearances of the phrase in various places in the specification are not necessarily all referring to the same embodiment, nor a separate or alternative embodiment that is mutually exclusive with other embodiments. It is explicitly and implicitly understood by those skilled in the art that the embodiments described herein may be combined with other embodiments.

The execution body of the message encoding method provided by the embodiment of the present application may be a message encoding device, or an electronic device integrating the message encoding device. The message encoding device may be implemented in hardware or software. Similarly, the execution body of the message decoding method provided by the embodiment of the present application may be a message decoding device, or an electronic device integrating the message decoding device. The message decoding device may be implemented in hardware or software.

The following first introduces some basic concepts involved in the embodiments of the present application.

Communication protocol: The rules and conventions that are followed by both entities to complete the communication or service. Multiple data communication systems in different geographical locations interconnected by communication channels and devices have a common language in order to enable them to work together to achieve message exchange and resource sharing. What to communicate, how to communicate, and when to communicate follow certain mutually acceptable rules. This rule is the communication protocol. Communication protocols include standard communication protocols and non-standard communication protocols, both of which have their own advantages and disadvantages. As shown in Table 1, the message format represents the characteristics of a message. The communication flow represents the entire process of a message from being sent to receiving. The content form represents the presentation form of a message data carried in a message. The encoding represents information that the device supplicant may need to send into a message. Decoding represents a recipient extracting useful information from the message. The amount of data represents the number of bytes occupied by the information after the message is formed. Stability represents the frequency of communication anomalies during the communication process.

TABLE 1

| | Message format | Communication process | Content format | Encoding or decoding difficulty | Data volume | Stability |
|---|---|---|---|---|---|---|
| Standard communication protocol | Fixed | Complete | Inflexible | Complex | Large | High |
| Non-standard communication protocol | Unfixed | Defective | Flexible | Simple | Small | Normal |

Standard communication protocol: such as, but not limited to, SECS communication protocol based on SEMI standard or the communication protocol based on other standards. Due to the need to be compatible with a diversity of communication content, a development process of encoding and decoding is cumbersome. In addition, too many encoded bytes are generated for a communication content with a large amount of messages, which occupies communication resources of a device and affects a communication speed of other modules.

Buffer area: Also known as cache, it is a part of memory space. Between input and output devices and CPU, a certain memory space is reserved in the memory space to buffer the input or output data. This enables low-speed input and output devices and a high-speed CPU to work in coordination, avoids the low-speed input and output devices occupying the CPU, and frees the CPU to work efficiently.

Message Queue: A container that holds messages during their transmission. A message queue manager acts as a middleman when relaying messages from its source to its destination. The main purpose of a queue is to provide routing and guarantee the delivery of messages. If the receiver is unavailable when the message is sent, the message queue holds the message until it can be delivered successfully.

The embodiments of the present application provide a message encoding method, a message decoding method, a message processing device, and a storage medium. The detailed descriptions will be given below.

The embodiments of the present application provide a message encoding method, which may include but not limited to the following embodiments and combinations of the following embodiments.

Figure 2:
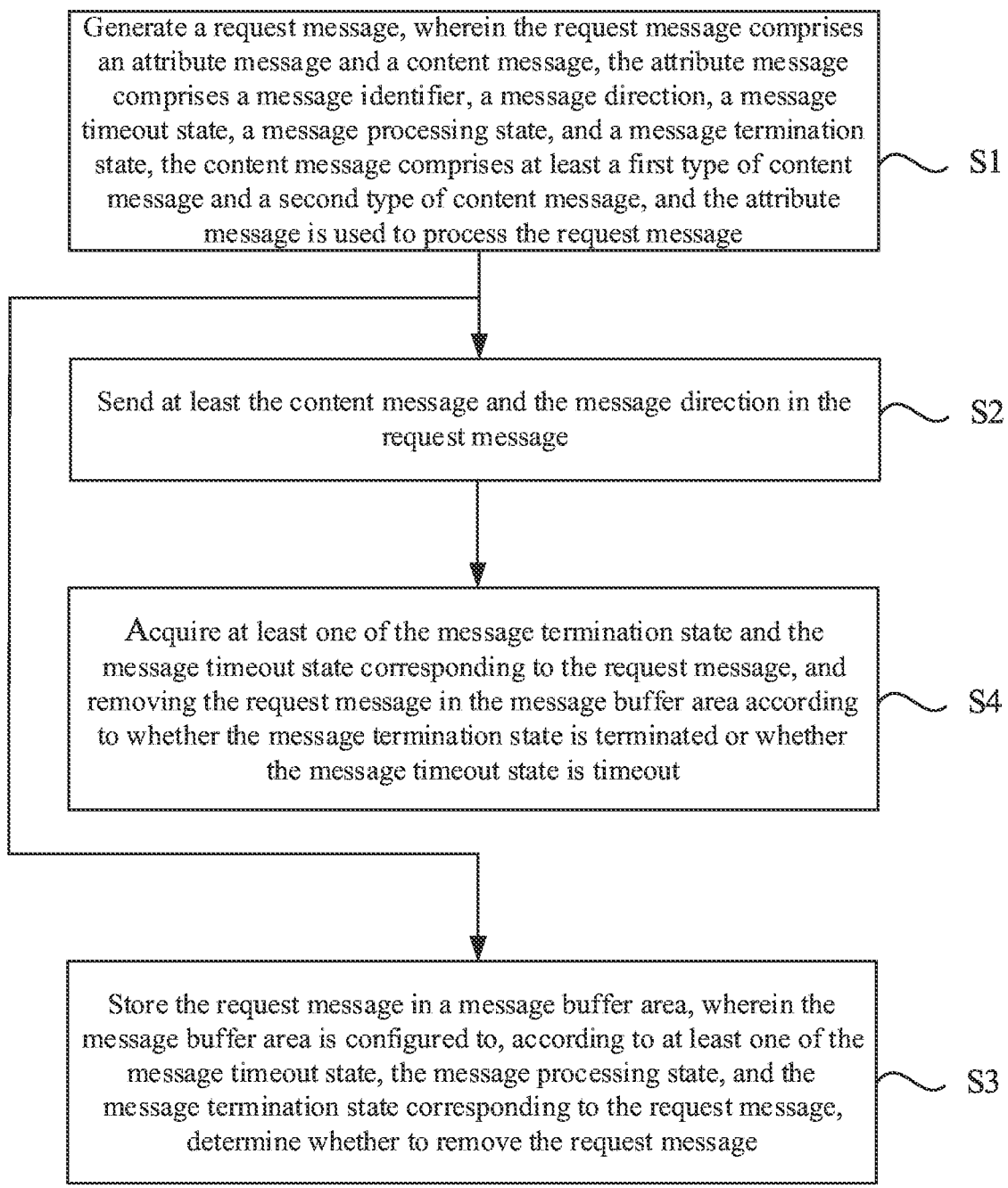
Figure 3:
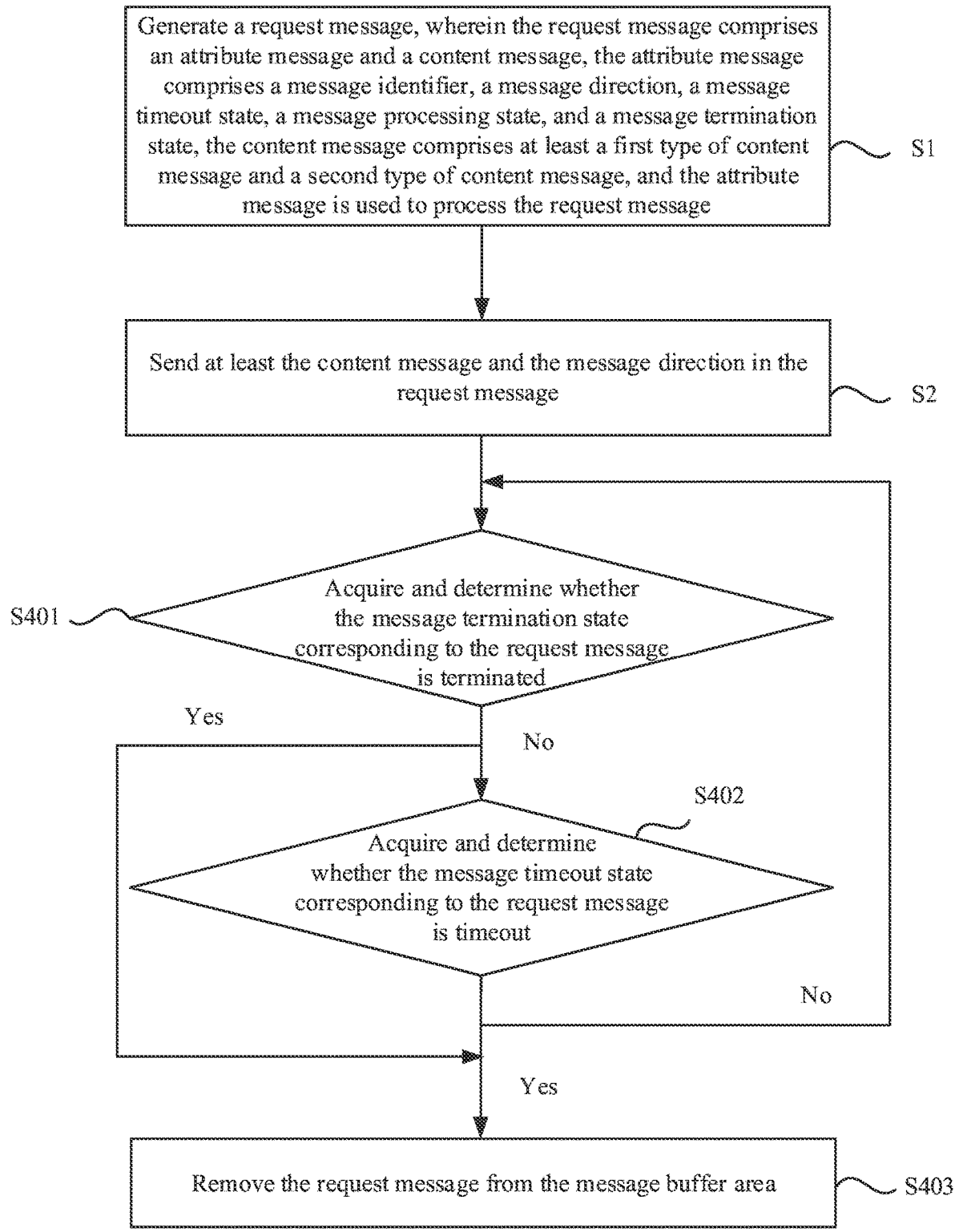

In one embodiment, as shown in FIG. 1 to FIG. 3, the message encoding method may include, but is not limited to, the following steps and combinations of the following steps.

S1: Generate a request message, wherein the request message comprises an attribute message and a content message, the attribute message comprises a message identifier, a message direction, a message timeout state, a message processing state, and a message termination state, the content message comprises at least a first type of content message and a second type of content message, and the attribute message is used to process the request message.

In conjunction with the discussion above, the information to be sent can be packaged (i.e., encoded) into a request message that includes a string of data. Specifically, the content message may include data presented by "information to be sent". Further, the type of "information to be sent" corresponding to the first type of content message and the type of "information to be sent" corresponding to the second type of content message may be different, such as numbers and letters, respectively. The attribute message may include the first attribute message. The first attribute message may include data representing the "characteristics of the message", e.g., may represent the state of the "characteristics of the message".

S2: Send at least the content message and the message direction in the request message.

Specifically, in conjunction with the above discussion, the sent request message may include a series of data representing "information to be sent" and its own "message characteristics". That is, the "information to be sent" and its own "message characteristics" are packaged (i.e., encoded) and sent. Further, the request message can be processed according to the first attribute message. That is, the data presented by the "information to be sent" can be processed according to the "characteristics of the message", so as to realize the processing of the "information to be sent" and avoid the inability or no basis for processing the request message.

It can be understood that, on the one hand, the content message in the request message in this embodiment may include at least two different types of "information to be sent". That is, the types of "information to be sent" are enriched to have flexible content forms. This enables different types of "information to be sent" to be sent at one time, avoiding an increase in the number of times that only a single "information to be sent" can be sent. On the other hand, the request message includes a first attribute message that can be used to process the request message and regulates the way of processing the request message. This makes the way of processing the request message based on rather than random processing, which can further improve a communication process, and can further improve a stability of the communication. Therefore, the message processing method in this embodiment can consider diversity and stability of communication content forms.

In an embodiment, the step S1 may include, but is not limited to, the following steps: Acquire and initialize an attribute message to be initialized to generate the attribute message, wherein the attribute message includes a message identifier and a message direction, and the message direction in the attribute message is initialized to the request direction from the message direction to be initialized. The request message is generated according to the attribute message.

An initialization object in this embodiment may be the first attribute message in the attribute message. That is, the first attribute message includes the message direction mentioned above. It should be noted that, in conjunction with the above discussion, the first attribute message may represent the "characteristics of the message". On the one hand, each request message has its own characteristics, which can be considered to be related to the "origin" of the request message and may not change with external changes. On the other hand, after each request message has undergone different processing, some features also need to be updated correspondingly to represent that it has undergone corresponding processing, that is, it can be changed with external changes.

Certainly, the first attribute message in the request message includes but is not limited to the message identifier or other parts, which may also be initialized by corresponding identifiers to be initialized or other parts to be initialized, which are not limited here. Specifically, it can be considered that the request message for sending is generated according to the first attribute message obtained after the above initialization.

In an embodiment, as shown in FIG. 2 and FIG. 3, after the step S1, the following steps may be further included but not limited to.

S3: Store the request message in a message buffer area, wherein the message buffer area is configured to, according to at least one of the message timeout state, the message processing state, and the message termination state corresponding to the request message, determine whether to remove the request message.

The second attribute message in the attribute message may include at least one of a message timeout state, a message processing state, and a message termination state. The message timeout state can represent whether the corresponding request message has timed out. For example, if the request message still exists in the message buffer area for a preset period of time since it was sent, the data corresponding to the message timeout state can be updated to indicate that the corresponding request message is "timeout". The message processing state can represent whether the corresponding request message is processed. For example, after the request message is processed by the receiver, the data corresponding to the message processing state may be updated to indicate that the corresponding request message is "processed". The message timeout state can represent whether the corresponding request message is terminated. For example, after the request message is abnormally disturbed or "processed", the data corresponding to the termination state of the message can be updated to indicate that the corresponding request message is "terminated".

It should be noted that, for the same reason, since the request message is not processed before being sent, the message timeout state can be initialized to "not timed out", the initialization message processing state is "unprocessed", and the initialization message termination state is "unterminated". This allows initialization messages to be processed and terminated for a preset duration.

It can be understood that the message timeout state, the message processing state, and the message termination state in the attribute message may be included in the second attribute message in the attribute message. That is, the second attribute message can also represent the "characteristics of the message". Further, it can be considered that after each request message has undergone different processing, some characteristics need to be updated correspondingly to represent that it has undergone corresponding processing. That is, it can be changed with the change of the outside world, that is, the second attribute message can represent the processing experienced by the request message. Specifically, each request message may correspond to a second attribute message, and the second attribute message may or may not be included in the corresponding request message. Regardless of whether the second attribute message is included in the corresponding request message, the second attribute message may change as the request message undergoes at least one processing. In addition, in the same way, since the request message has not undergone any processing before being sent, the second attribute message corresponding to the request message can be initialized at this time, which can also indicate that the request message has not undergone any processing.

Specifically, when the second attribute message is included in the corresponding request message, it can also be formed in a series of data included in the request message like the first attribute message. The second attribute message in the string of data included in the request message is updated at any time according to the processing situation of the request message. When the second attribute message is not included in the corresponding request message, between generating and requesting the message and sending the request message, the second attribute message corresponding to the request message may be stored in the message buffer area. Later, the corresponding second attribute message in the message buffer area can be changed at any time according to the processing situation of the request message. It should be noted that this embodiment does not limit the sequence of step S2 and step S3, and even step S2 and step S3 may be performed simultaneously.

As discussed above, the request message may be stored in a message buffer area before or at the same time as it is sent. Further, the current latest request message can be stored in the memory space at the end of the message buffer area. On the one hand, the presence of the request message in the message buffer area may indicate that the request message has been sent. On the other hand, after the request message is sent, it may be determined whether to remove the request message according to the second attribute message corresponding to the request message. That is, the processing of the request message can be monitored at any time. The presence of the request message in the message buffer area may indicate that the request message has been sent and is in a state that can be processed. A non-existent request message may indicate that the request message cannot be processed. In addition, the message buffer area can be updated at any time according to the second attribute message corresponding to the request message to remove the request message. This prevents the previous request message from occupying memory resources and processing resources and improves the efficiency of message processing.

In one embodiment, as shown in FIG. 2 and FIG. 3, the message buffer area is configured to determine whether to remove the request message according to at least one of the message timeout state and the message processing state corresponding to the request message; after the step S2, the following steps may also be included but not limited to.

S4: Acquire at least one of the message termination state and the message timeout state corresponding to the request message, and removing the request message in the message buffer area according to whether the message termination state is terminated or whether the message timeout state is timeout.

In combination with the above discussion, after step S2 is executed, that is, after the request message has been sent, the "message characteristics" of the request message may also change with the passage of time and changes in processing state. That is, the message timeout state, the message processing state, and the message termination state mentioned above will be updated. Specifically, the message based on the second attribute here includes the description of the message timeout state and the message termination state. As discussed above, the message termination state may represent whether the request message is abnormally disturbed, or is in a "processed" state, etc.

Specifically, for each request message, after it has been sent, the requesting party can obtain at least one of the message termination state and the message timeout state corresponding to the request message at any time, so as to determine whether the message termination state is terminated or if the message timeout state is timeout. Further, when the message termination state is terminated or the message timeout status is timeout, the request message in the message buffer area may be removed to update the message buffer area. This prevents the previous request message from occupying memory resources and processing resources and improves the efficiency of message processing.

In an embodiment, as shown in FIG. 3, the step S4 may include, but is not limited to, the following steps and combinations of the following steps.

S401: Acquire and determine whether the message termination state corresponding to the request message is terminated.

Specifically, with reference to the above discussion, step S301 can be used to determine whether the request message is abnormally interfered or whether it is in a state of "processed" or the like. If the message termination state corresponding to the request message is terminated, it may be considered that the request message cannot be processed or need not be processed.

If the termination state of the message is not terminated, perform but not limited to the following steps:

S402: Acquire and determine whether the message timeout state corresponding to the request message is timeout.

Specifically, in combination with the above discussion, when the message termination state is not terminated, that is, when the request message can be processed or needs to be processed, further, through step S302, any request message can be sent based on the message buffer area to determine the request message. Whether it has exceeded a preset duration since it was sent. If the message termination state corresponding to the request message is timeout, it can be considered that the request message is prohibited from being processed again.

It is understood that, as shown in FIG. 3, after step S401, if the message termination state is terminated, step S403 may also be executed but not limited to, to remove the request message in the message buffer area. In combination with the above discussion, at this time, the request message has been abnormally interfered or is in a state such as "processed", such that the request message cannot be processed or no longer needs to be processed, and the request message can be removed to release the corresponding memory space. This can avoid waste of memory resources and processing resources and improve the efficiency of message processing.

If the message timeout state is timeout, execute but not limited to step S403 mentioned above.

Specifically, based on the above discussion, based on the fact that the message termination state is not terminated, and the message timeout state is timeout, it can be understood that the request message occupies the message buffer area for too long, or exceeds the waiting time that the request message can bear. At this time, removing the request message in the message buffer area can release the corresponding memory space in time. This can avoid waste of memory resources and processing resources and improve the efficiency of message processing.

It is understood that, as shown in FIG. 3, after step S402, if the message timeout state is not timeout, step S401 may also be executed but is not limited to step S401. That is, it continues to determine whether the message termination state corresponding to the request message is terminated. For the subsequent steps, reference may be made to the above discussion on the subsequent steps of step S401.

It can be understood that, in combination with the above discussion, the request message in the message buffer area can be removed if the message termination state is terminated or the message timeout state is timeout. Therefore, in the present application, the corresponding sequence of the above determinations of the message termination state and the message timeout state is not limited, and even both can be performed simultaneously. Further, in order to save resources, a corresponding determination can be made on any one of them first, and then it is determined whether to make a corresponding determination on the other one according to the corresponding determination. Ultimately, at least one of the above-discussed determinations can be made to remove the request message in the message buffer area. Understandably, if the two determinations discussed above do not remove the request message in the message buffer area, it is necessary to return to step S401, and repeat the two determinations discussed above until the request information in the message buffer area is removed.

Figure 4:
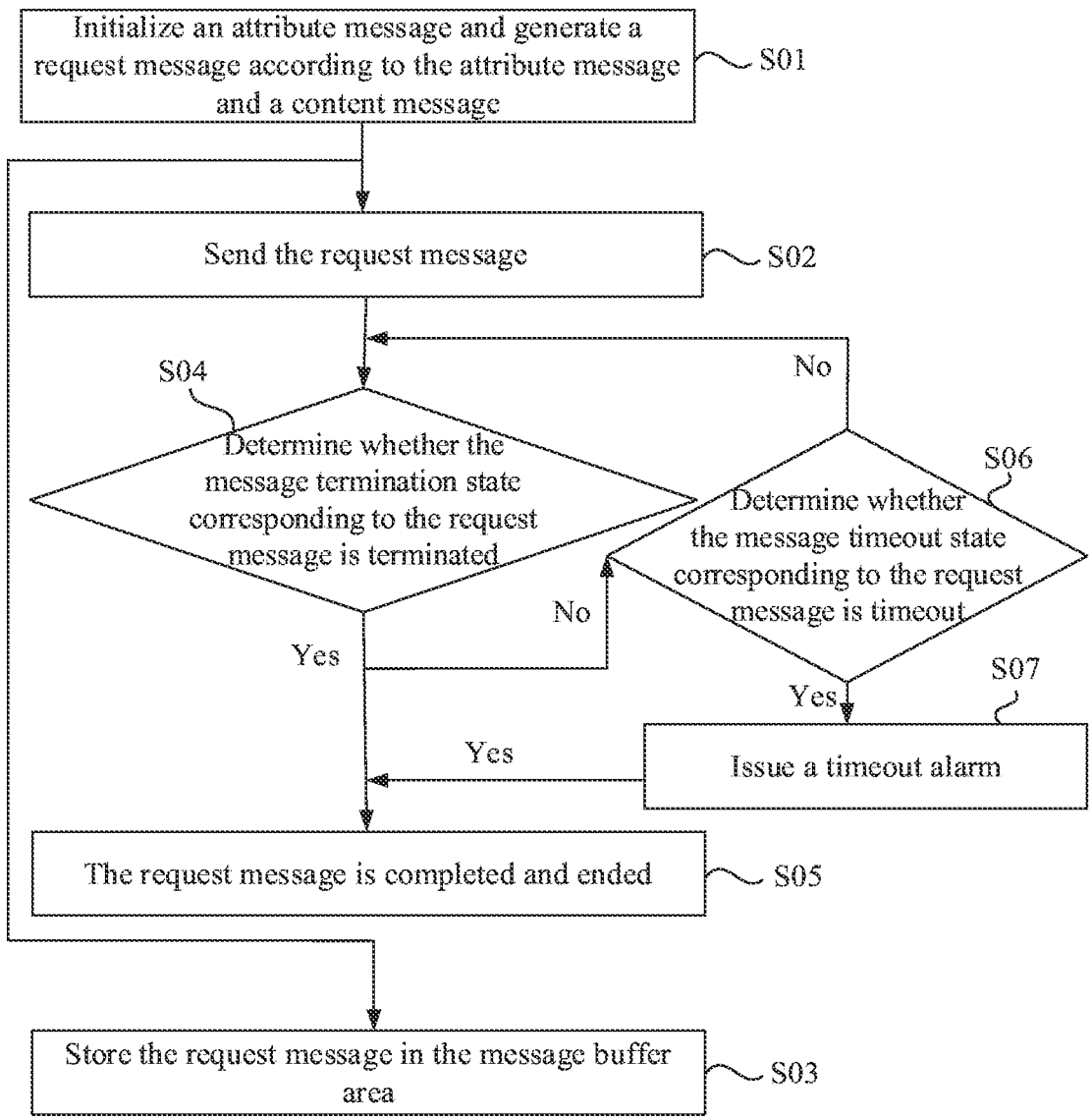
Figure 5:
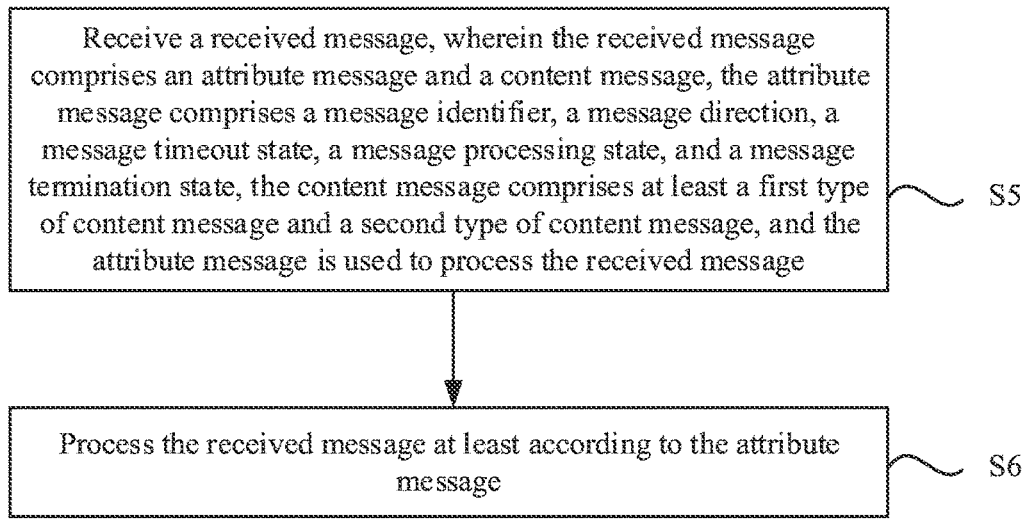
Figure 6:
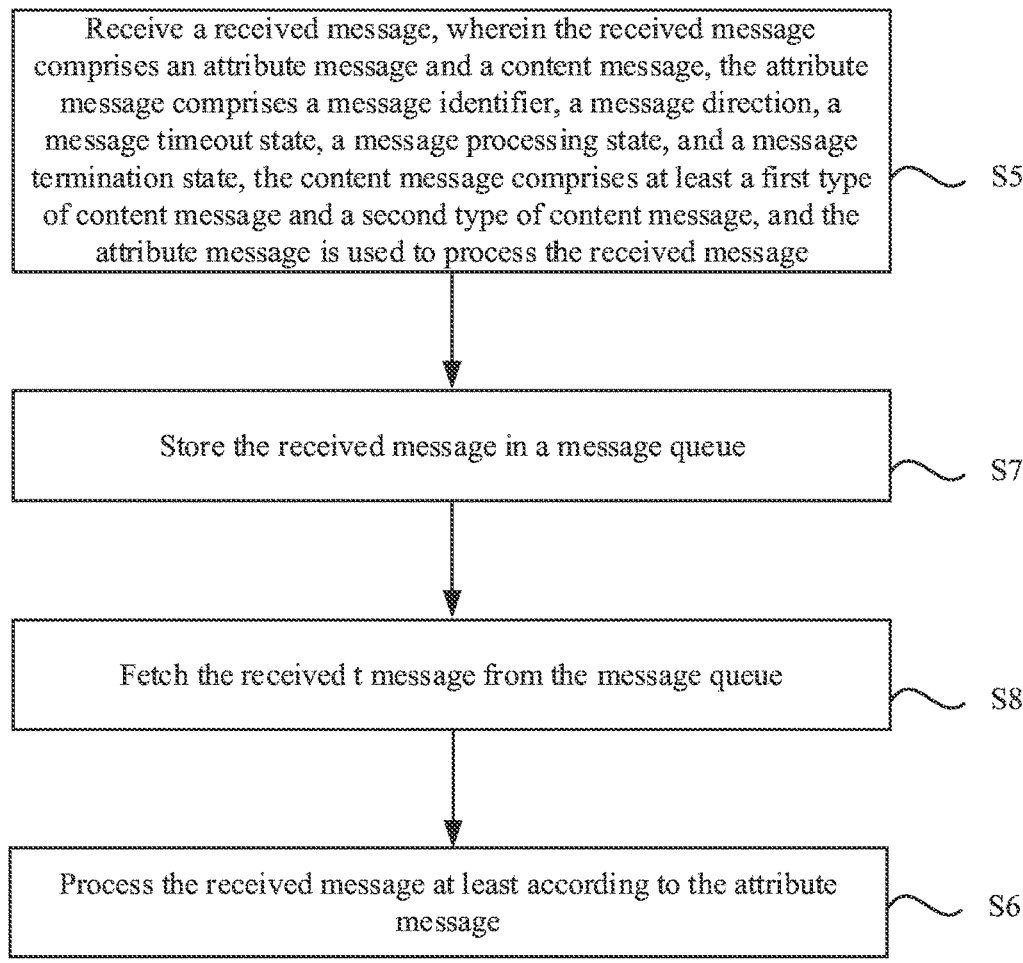

With reference to the above related descriptions about step S1, step S2, and other steps, as shown in FIG. 4, the message encoding method may also include, but is not limited to, the following steps and combinations of the following steps.

S01: Initialize an attribute message and generate a request message according to the attribute message and a content message.

S02: Send the request message.

S03: Store the request message in the message buffer area.

S04: Determine whether the message termination state corresponding to the request message is terminated.

If it is terminated, then execute S05, and the request message is completed and ended.

If it is not terminated, then execute S06 to determine whether the message timeout state corresponding to the request message is timeout.

If it is timeout, then execute S07, issue a timeout alarm; execute S05, the request message is completed and ended.

If it is timeout, execute S01.

The message decoding method further provided by the embodiments of the present application may include but not limited to the following embodiments and combinations of the following embodiments.

In one embodiment, as shown in FIG. 5 to FIG. 9, the message decoding method may include, but is not limited to, the following steps and combinations of the following steps.

S5: Receive a received message, wherein the received message comprises an attribute message and a content message, the attribute message comprises a message identifier, a message direction, a message timeout state, a message processing state, and a message termination state, the content message comprises at least a first type of content message and a second type of content message, and the attribute message is used to process the received message.

As discussed above, the format of the received message and the format of the request message may be at least partially the same. That is, both can include at least attribute message and content message. Herein, the attribute message, the content message, the first type of content message and the second type of content message may refer to the relevant corresponding descriptions above, respectively. The received message may be, but is not limited to, the "request message" mentioned above, and at this time, reference may be made to the above related description. The received message may also be a "reply message" for replying to the request message. The content message of the "reply message" may be the "replied information" of the corresponding content message of the "request message" (i.e., "information to be sent"). Likewise, the "attribute message" of the "reply message" in step S5 can be the "first attribute message" mentioned above. That is, the state of the "reply information" can be represented.

S6: Process the received message at least according to the attribute message.

In conjunction with the above discussion, the received message may be, but is not limited to, the above-mentioned "request message" or a "reply message" for replying to the request message. The attribute message is used to represent the "message characteristics" of the received message and can represent the state information of the received message. Further, the received message can be processed according to the attribute message. That is, at least the data presented by " " of the received message can be processed according to the "characteristics of the message", so as to avoid inability or no basis for processing the received message. Specifically, the received message can be decoded to obtain the data corresponding to the attribute message and the data corresponding to the content message, and then how to process the data corresponding to the attribute message is determined according to the data corresponding to the content message to obtain the corresponding message.

It can be understood that, on the one hand, the content message in the received message in this embodiment may include at least two different types of "information to be sent", two different types of "reply information", or two different types of other information. That is, the types of information are enriched to have flexible content forms, so that different types of information can be sent at one time, and it is avoided that only a single piece of information can be sent, thereby causing an increase in the number of sending times. On the other hand, the received message includes the attribute message that can be used to process the received message and standardizes the way of processing the received message. This makes the way of processing the received message based on rather than random, which can further improve the communication flow and further improve the stability of the communication. Therefore, the message processing method in this embodiment can consider the diversity and stability of communication content forms.

In an embodiment, as shown in FIG. 6 to FIG. 9, before step S6, the following steps may be included but not limited.

S7: Store the received message in a message queue.

Specifically, in conjunction with the above discussion, the message queue may store the received message. This avoids the issue that when the receiving speed of the received message is faster than the processing speed of the received message, the multiple received messages cannot be processed at the same time, resulting in the loss or exception of the multiple received messages.

S8: Fetch the received t message from the message queue.

The message queue is, but not limited to, a first-in, first-out queue. Here, the message queue is a first-in-first-out queue as an example for description. That is, the received message that first enters the message queue can be taken out first, and the received message that enters the message queue later can be taken out later.

Specifically, the current received message may be stored at the end of the message queue. When the received message being processed has finished processing, the received message at the top of the message queue can be taken out for processing. Then repeat the execution of "store the current received message with the end of the message queue, when the received message being processed is processed, the received message at the top of the message queue can be taken out for processing". When the received message in step S7 is at the top of the message queue, and the received message being processed has been processed, steps S8 and S6 may be executed.

In particular, when the message queue includes a plurality of received messages, in combination with the above discussion, the received message at the top of the message queue can be fetched for processing. Further, if the resources required for processing the received message at the top of the message queue and the next received message are different, the received message at the top of the message queue is read out in the process of being processed, and the next received message can also be read for processing. This can meet the high concurrent performance of the device, while also simplifying the processing flow and reducing the risk of abnormal communication.

Figure 7:
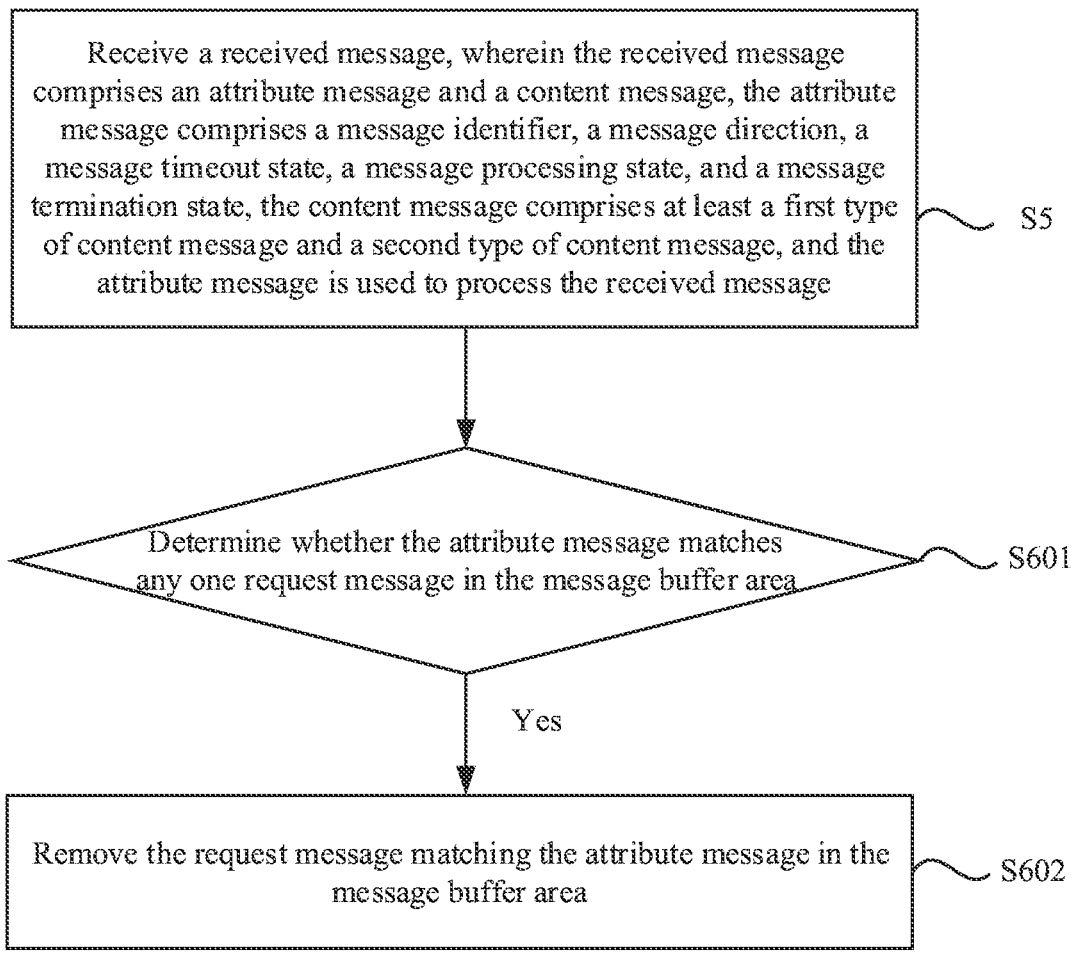
Figure 8:
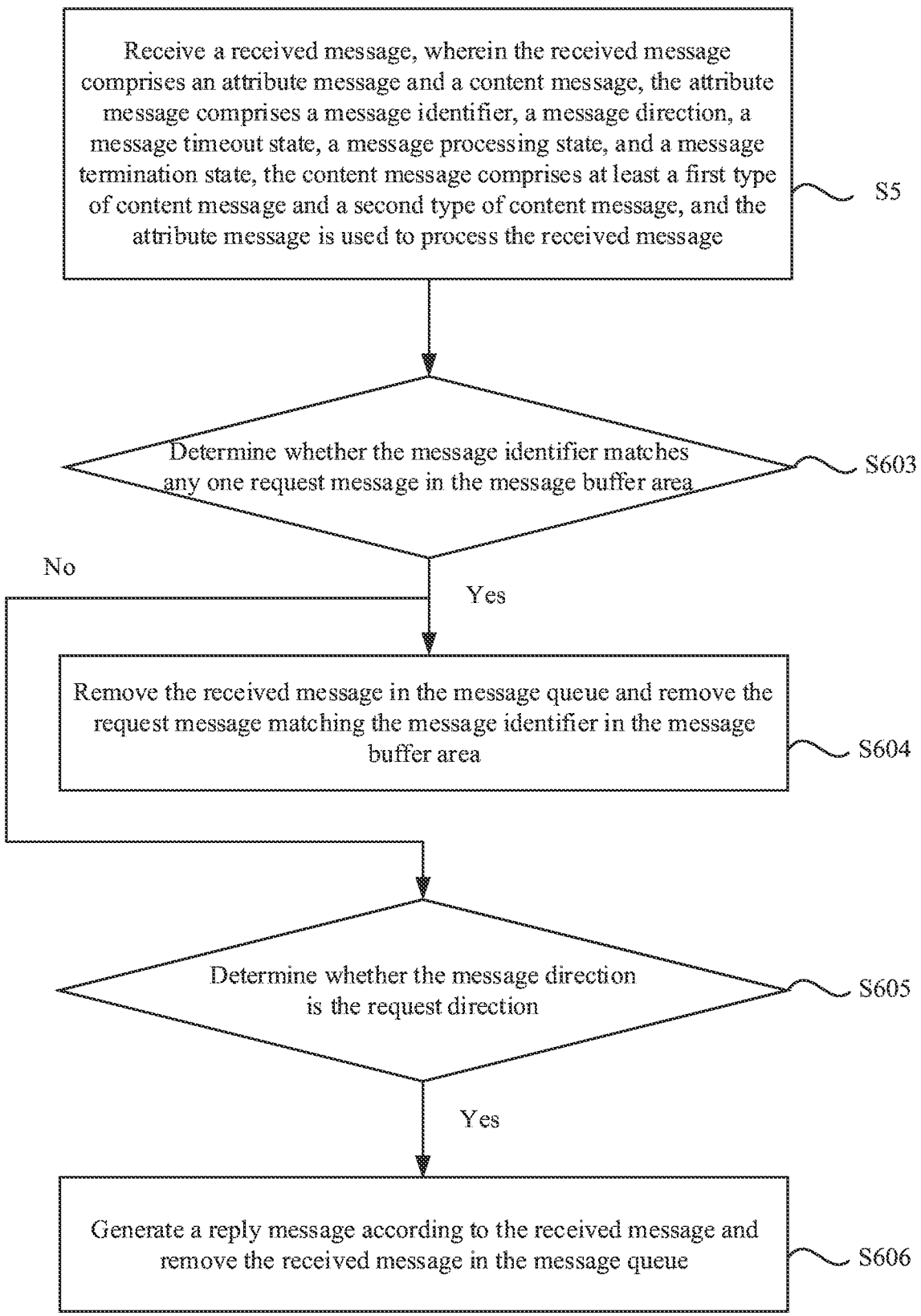
Figure 9:
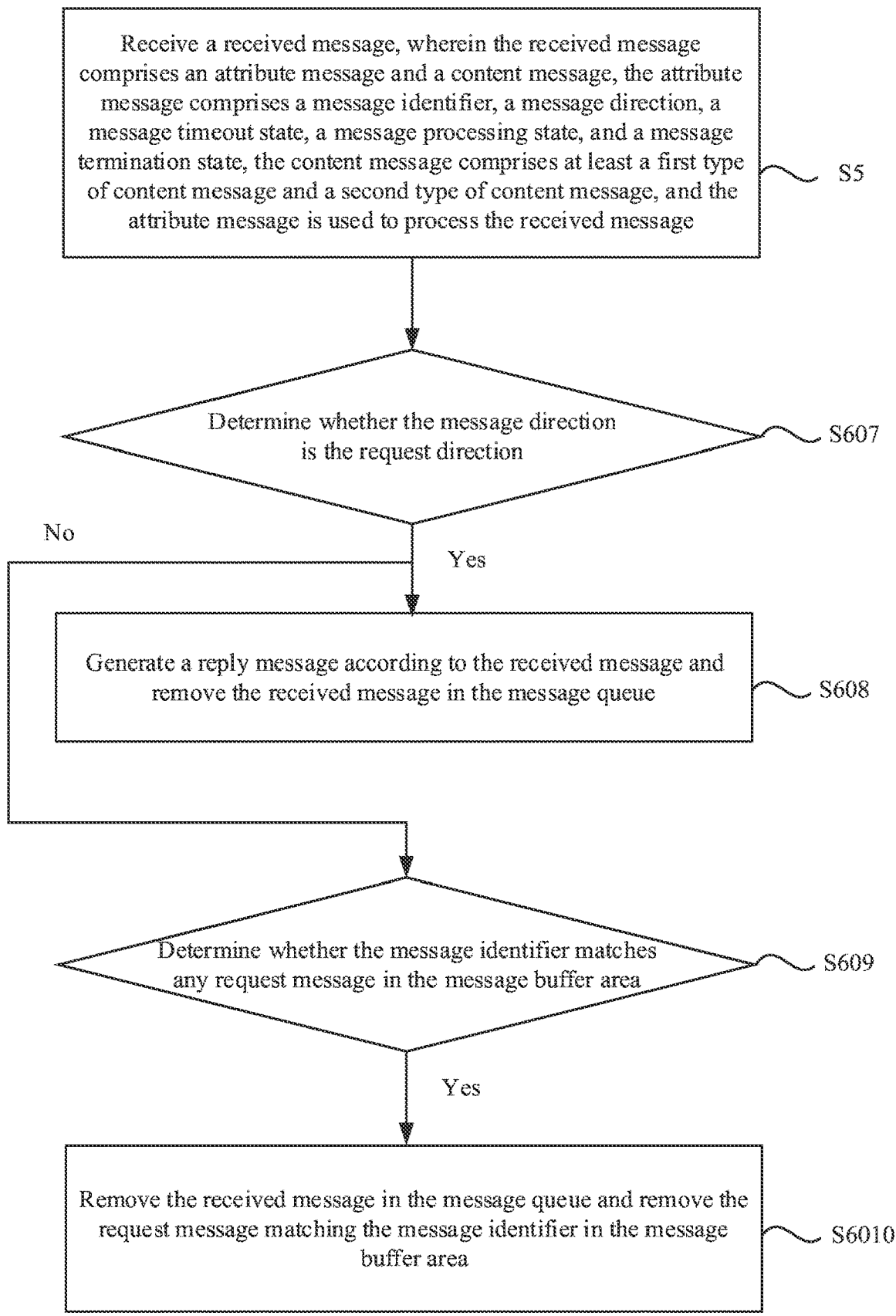

In an embodiment, as shown in FIG. 7 to FIG. 9, the step S6 may include, but is not limited to, the following steps and combinations of the following steps.

S601: Determine whether the attribute message matches any one request message in the message buffer area.

Specifically, with reference to the above discussion, the "attribute message" in step S601 may be the "first attribute message" mentioned above. That is, after the request message is generated, the request message is also stored in the message buffer area, and the request message in the message buffer area includes the corresponding first attribute message. Further, it can be compared and determined whether the first attribute message in the received message matches the first attribute message corresponding to the request message in the message buffer area. Further, "matching" here can be understood as the first attribute message of the received message and the first attribute message of the request message are the same.

In conjunction with the above discussion, the received message may be, but is not limited to, the above-mentioned "request message" or a "reply message" for replying to the request message. Further, if the first attribute message matches any request message in the message buffer area, it can be considered that the corresponding received message is the "reply message" corresponding to the matched request message. On the contrary, it can be considered that the corresponding received message may be a request message or other non-"reply message".

If the attribute message matches any of the request messages in the message buffer, perform but not limited to the following steps:

S602: Remove the request message matching the attribute message in the message buffer area.

Specifically, with reference to the above discussion, the "attribute message" in step S602 may be the "first attribute message" mentioned above. It can be understood that, in combination with the above discussion, if the first attribute message matches any request message in the message buffer, it can be considered that the corresponding received message is the "reply message" corresponding to the matched request message. That is, it can be considered that the matched request message has been processed to obtain a corresponding "reply message". Therefore, the request message matching the first attribute message (that is, the message having the same first attribute) in the message buffer may be removed to release the corresponding memory space. This can avoid waste of memory resources and processing resources and improve the efficiency of message processing. Meanwhile, after the received message is processed according to the first attribute message, the received message in the message queue may also be removed to release the corresponding memory space. This can avoid waste of memory resources and processing resources and improve the efficiency of message processing. It can be considered that in the process of processing the received message, the received message can still be stored in the message queue to avoid the abnormal operation in the processing process resulting in the accidental deletion of the received message, so that the received message cannot be read and continued to be processed.

In one embodiment, the message buffer is used to determine whether to remove the request message according to a second attribute message corresponding to the request message, wherein the second attribute message includes at least one of a message timeout state, a message processing state, and a message termination state.

It should be noted that the received message may also have a corresponding second attribute message. The second attribute message may also represent at least one of a message timeout state, a message processing state, and a message termination state of the received message. Regardless of whether the second attribute message is included in the corresponding received message or in the message buffer area corresponding to the corresponding received message, before step S602, the message processing state of the request message corresponding to the received message may be set to "processed". Further, the message termination state of the request message corresponding to the received message may also be set to "terminated". Based on this, the second attribute message of the request message in the message buffer can be updated at any time.

Here, the second attribute message includes a message timeout state and a message termination state. The above-mentioned steps of "the second attribute message of the request message in the message buffer area may be updated at any time" may include but are not limited to the following steps: Acquire at least one of the message termination state and the message timeout state corresponding to the request message, and remove the message according to whether the message termination state is terminated or whether the message timeout state is timeout the request message in the message buffer area.

Specifically, reference may be made to the above related description of step S4. This embodiment can be understood as a specific description of how to update the second attribute message of the request message in the message buffer area. It should be noted that, in this application, "acquiring at least one of the message termination state and the message timeout state corresponding to the request message . . . removing the request message in the message buffer area" and the sequence of other steps is not limited. For example, this step can be performed periodically, or it can be performed every time the second attribute message is updated, or it can be performed after a received message is received, or it can be performed after the received message is read from the message queue.

In one embodiment, as shown in FIG. 8, the first attribute message includes a message identifier, and the step S6 may include, but is not limited to, the following steps and combinations of the following steps.

S603: Determine whether the message identifier matches any one request message in the message buffer area.

Specifically, as discussed above, the message identifier may represent the "origin" of the request message. That is, it can indicate which device, which unit or even which process the request message is generated by. It is understood that the message identifier may also include other data for querying the request message, and the request message in the message buffer area includes the corresponding message identifier. Further, it can be compared and determined whether the message identifier in the received message matches the message identifier corresponding to the request message in the message buffer area. Further, "matching" here can be understood as the message identifier of the received message and the message identifier of the request message are the same.

If the message identifier matches any of the request messages in the message buffer area, perform but not limited to the following steps:

S604: Remove the received message in the message queue and remove the request message matching the message identifier in the message buffer area.

It can be understood that, in combination with the above discussion, if the message identifier matches any message identifier in the message buffer area, it can be considered that the corresponding received message is the "reply message" corresponding to the matched request message. That is, it can be considered that the matched request message has been processed to obtain a corresponding "reply message". Therefore, the request message matching the message identifier (i.e., having the same message identifier) in the message buffer area can be removed to release the corresponding memory space. This can avoid waste of memory resources and processing resources and improve the efficiency of message processing.

Meanwhile, after the received message is processed according to the message identifier, the received message in the message queue may also be removed to release the corresponding memory space. This can avoid waste of memory resources and processing resources and improve the efficiency of message processing. It can be considered that in the process of processing the received message, the received message can still be stored in the message queue to avoid the abnormal operation in the processing process resulting in the accidental deletion of the received message, so that the received message cannot be read and continued to be processed.

It should be noted that the received message may also have a corresponding second attribute message. The second attribute message may also represent at least one of a message timeout state, a message processing state, and a message termination state of the received message. Regardless of whether the second attribute message is included in the corresponding received message or included in the message buffer area corresponding to the corresponding received message, the received message is taken as an example of a "reply message" for illustration herein: Before step S604, the message processing state of the request message corresponding to the received message of the "reply message" may be set to "processed". Further, the message termination state of the request message corresponding to the received message of the "reply message" may also be set to "terminated". Based on this, the second attribute message of the request message in the message buffer area can be updated at any time.

In an embodiment, as shown in FIG. 8, the first attribute message further includes a message direction, and after step S603, the following steps and combinations thereof may be included but not limited to.

If the message identifier does not match any of the request messages in the message buffer area, perform but not limited to the following steps:

S605: Determine whether the message direction is the request direction.

Specifically, according to the above discussion, if the message identifier does not match any message identifier in the message buffer area, it can be considered that the corresponding received message is not the "reply message" corresponding to any request message in the message buffer area. Further, at this time, it can be determined whether the message direction of the received message is the request direction, so as to determine whether the received message is a "request message".

If the message direction is the request direction, perform but not limited to the following steps:

S606: Generate a reply message according to the received message and remove the received message in the message queue.

It can be understood that, according to the above discussion, if the message direction is the request direction, it means that the received message is a request message, that is, the received message request is processed. It should be noted that, in combination with the above discussion, the received message may also have a corresponding second attribute message. Here, the received message is a "request message" as an example for illustration: After step S606, the generated "reply message" can be sent to another device as a received message of the other device, and the message direction can be updated to be the reply direction. Similarly, another device may perform, but not limited to, steps S603 and S604 above. Likewise, the message processing state of the corresponding request message in the message buffer area in another device may also be set to "processed". Further, the message termination state of the request message corresponding to the received message of the "reply message" may also be set to "terminated". Based on this, the second attribute message of the request message in the message buffer area can be updated at any time.

Similarly, after the reply message is generated according to the received message, the received message in the message queue can also be removed to release the corresponding memory space, which can avoid the waste of memory resources and processing resources and improve the efficiency of message processing.

In an embodiment, as shown in FIG. 9, the first attribute message includes a message direction and a message identifier, and step S6 may include but is not limited to the following steps and combinations of the following steps.

S607: Determine whether the message direction is the request direction.

Specifically, it can be determined whether the message direction of the received message is the request direction, so as to determine whether the received message is a "request message".

If the message direction is the request direction, perform but not limited to the following steps:

S608: Generate a reply message according to the received message and remove the received message in the message queue.

It can be understood that, according to the above discussion, if the message direction is the request direction, it means that the received message is a request message, that is, the received message request is processed. It should be noted that, in combination with the above discussion, the received message may also have a corresponding second attribute message. Here, the received message is a "request message" as an example for illustration: After step S608, the generated "reply message" can be sent to another device as a received message of the other device, and the message direction can be updated to the reply direction.

Similarly, after the reply message is generated according to the received message, the received message in the message queue can also be removed to release the corresponding memory space. This can avoid waste of memory resources and processing resources and improve the efficiency of message processing.

If the message direction is not the request direction, perform but not limited to the following steps:

S609: Determine whether the message identifier matches any request message in the message buffer area.

Specifically, according to the above discussion, if the message direction is not the request direction, it can be considered that the corresponding received message is not a request message requesting to be processed. Further, at this time, it can be determined whether the message identifier matches any request message in the message buffer area, so as to determine whether the received message is a "reply message".

As discussed above, the message identifier may represent the "origin" of the request message. That is, it can indicate which device, which unit or even which process the request message is generated by. It is understood that the message identifier may also include other data for querying the request message, and the request message in the message buffer area includes the corresponding message identifier. Further, it can be compared and determined whether the message identifier in the received message matches the message identifier corresponding to the request message in the message buffer area. Further, "matching" here can be understood as the message identifier of the received message and the message identifier of the request message are the same.

S6010: Remove the received message in the message queue and remove the request message matching the message identifier in the message buffer area.

It can be understood that, in combination with the above discussion, if the message identifier matches any message identifier in the message buffer, it can be considered that the corresponding received message is the "reply message" corresponding to the matched request message. That is, it can be considered that the matched request message has been processed to obtain a corresponding "reply message". Therefore, the request message matching the message identifier (i.e., having the same message identifier) in the message buffer can be removed to release the corresponding memory space. This can avoid waste of memory resources and processing resources and improve the efficiency of message processing.

In addition, after the received message is processed according to the message identifier, the received message in the message queue may also be removed to release the corresponding memory space. This can avoid waste of memory resources and processing resources and improve the efficiency of message processing. It can be considered that in the process of processing the received message, the received message can still be stored in the message queue to avoid the abnormal operation in the processing process resulting in the accidental deletion of the received message, so that the received message cannot be read and continued to be processed.

It should be noted that the received message may also have a corresponding second attribute message. The second attribute message may also represent at least one of a message timeout state, a message processing state, and a message termination state of the received message. Regardless of whether the second attribute message is included in the corresponding received message or included in the message buffer area corresponding to the corresponding received message, the received message is taken as an example of a "reply message" for illustration herein: Before step S6010, the message processing state of the request message corresponding to the received message of the "reply message" may be set to "processed". Further, the message termination state of the request message corresponding to the received message of the "reply message" may also be set to "terminated". Based on this, the second attribute message of the request message in the message buffer area can be updated at any time.

Further, in combination with the above discussion, after step S608, the generated "reply message" may be sent to another device as a received message of the other device, and the message direction may be updated to be the reply direction. Similarly, another device may perform, but not limited to, steps S609 and S6010 above.

It can be understood that the difference between the embodiment shown in FIG. 9 and the embodiment shown in FIG. 8 lies in "determining whether the message direction is the request direction" and "determining whether the any request message identifier matches the message buffer area" has a different order, and the order of the two is not limited in this application.

Figure 10:
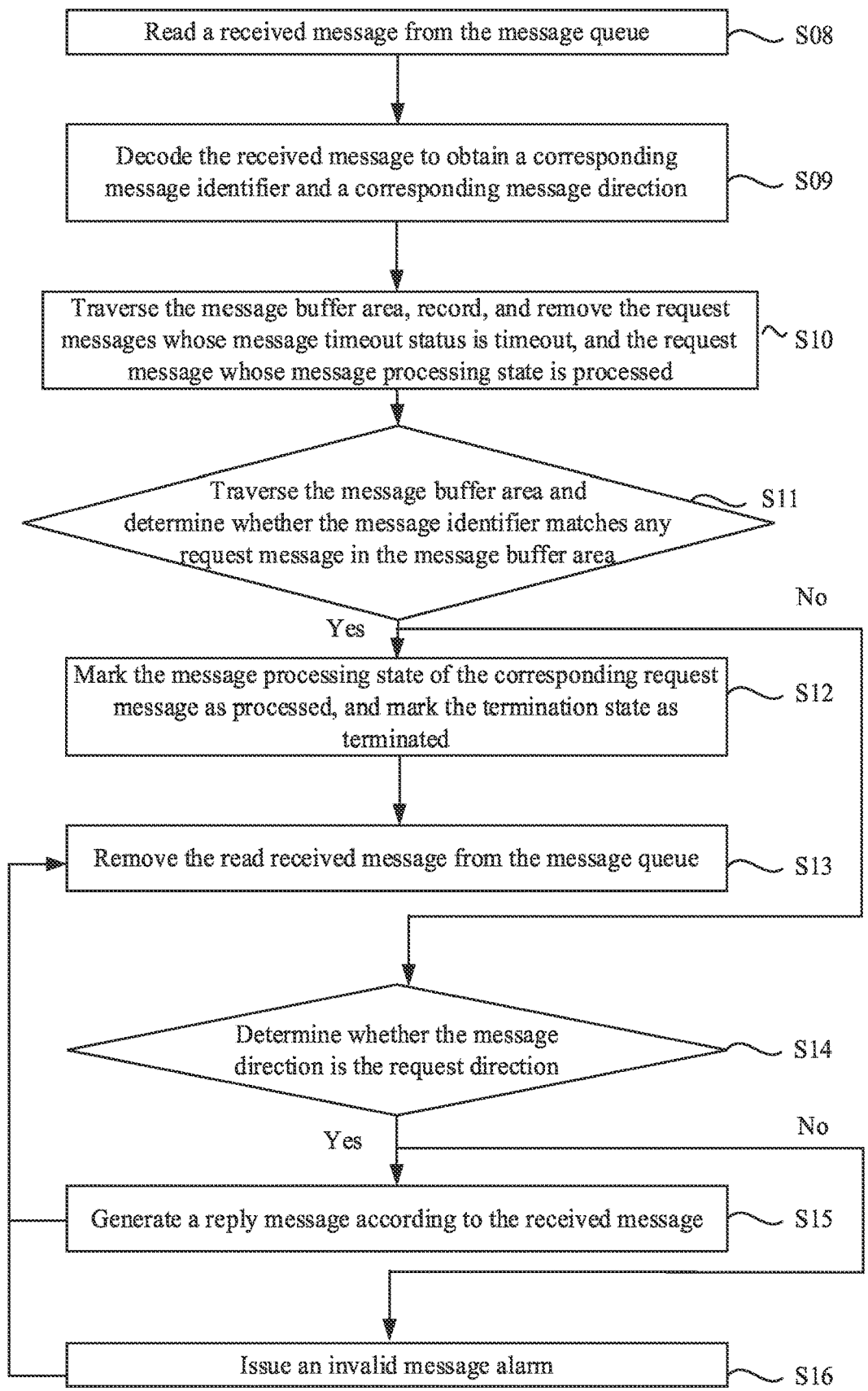

With reference to the above related descriptions about step S5, step S6, step S7, step S8 and other steps, as shown in FIG. 10, the message processing method may also include but not limited to the following steps and combinations between the following steps.

S08: Read a received message from the message queue.

S09: Decode the received message to obtain a corresponding message identifier and a corresponding message direction.

S10: Traverse the message buffer area, record, and remove the request messages whose message timeout status is timeout, and the request message whose message processing state is processed.

S11: Traverse the message buffer area and determine whether the message identifier matches any request message in the message buffer area.

If the message identifier matches any request message in the message buffer area, execute S12, mark the message processing state of the corresponding request message as processed, and mark the termination state as terminated; and execute S13 to remove the read received message from the message queue.

If the message identifier does not match any request message in the message buffer area, execute S14 to determine whether the message direction is the request direction.

If the message is the request direction, then perform S15, generate a reply message according to the received message; and perform S13, remove the read received message from the message queue.

If the message is not in the request direction, execute S16 to issue an invalid message alarm; and execute S13 to remove the read received message from the message queue.

Figure 11:
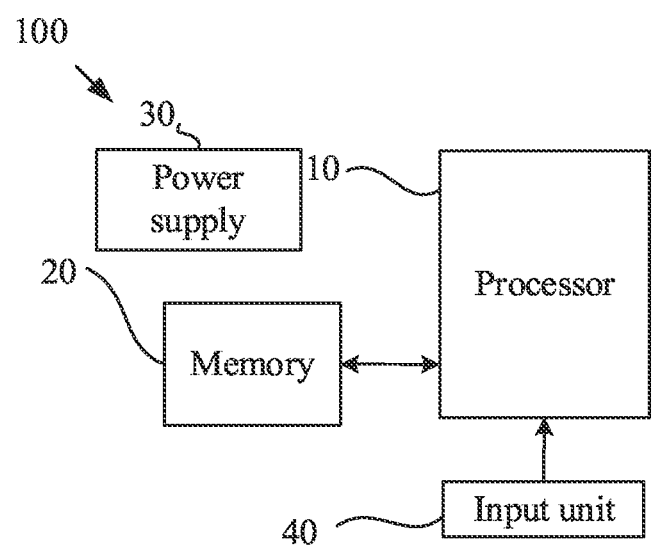
FIG. 11 is a schematic structural diagram of a message processing device provided by an embodiment of the present application.

This embodiment of the present application further provides a message processing device. As shown in FIG. 11, the message processing device 100 may include a memory and a processor. The memory is used to store program instructions. The processor is adapted to execute the program instructions to implement a method as described in any of the above. The message processing device 100 may be, but not limited to, a server or a terminal.

The message processing device 100 may include a processor 10 of one or more processing cores, a memory 20 of one or more computer-readable storage media, a power supply 30 and an input unit 40 and other components. Those skilled in the art can understand that the structure of the message processing device 100 shown in FIG. 11 does not constitute a limitation on the message processing device 100 and may include more or less components than those shown, or combine some components, or different component layout.

The processor 10 is a control center of the message processing device 100. The processor 10 uses various interfaces and lines to connect various parts of the entire message processing device 100, the processor 10 runs or executes software programs and modules stored in the memory 20, and the processor 10 invokes data stored in the memory 20, performs various functions of the message processing device 100 and processes data. Thus, the overall monitoring of the message processing device 100 is performed. Optionally, the processor 10 may include one or more processing cores. The processor 10 may be a central processing unit (CPU), or other general-purpose processors, a digital signal processor (DSP), an application specific integrated circuit (ASIC), an off-the-shelf processor field-programmable gate array (FPGA) or other programmable logic devices, discrete gate or transistor logic devices, discrete hardware components, etc. A general purpose processor may be a microprocessor, or the processor may be any conventional processor or the like. Preferably, the processor 10 can integrate an application processor and a modem processor. The application processor mainly handles the operating system, user interface, and application programs. The modem processor mainly handles wireless communication. It can be understood that the above-mentioned modulation and demodulation processor may not be integrated into the processor 10.

The memory 20 may be used to store software programs and modules. The processor 10 executes various functional applications and data processing by executing software programs and modules stored in the memory 20. The memory 20 may mainly include a storage program area and a storage data area. The stored program area can store an operating system, an application program required for at least one function (such as a sound playback function, an image playback function, etc.), and the like. The storage data area may store data or the like created according to use of the message processing device 100. In addition, the memory 20 may include high-speed random access memory, and may also include non-volatile memory such as at least one magnetic disk storage device, flash memory device, or other volatile solid state storage device. Accordingly, the memory 20 may also include a memory message processing device 100 to provide the processor 10 with access to the memory 20.

The message processing device 100 also includes a power supply 30 for powering the various components. Preferably, the power supply 30 may be logically connected to the processor 10 through a power management system, so that functions such as charging, discharging, and power consumption management are implemented through the power management system. The power supply 30 may also include one or more DC or AC power sources, recharging systems, power failure detection circuits, power converters or inverters, power status indicators, and any other components.

The message processing device 100 may further include an input unit 40. The input unit 40 may be used to receive input numerical or character messages, as well as generate keyboard, mouse, joystick, optical or trackball signal input related to user settings and function control.

Although not shown, the message processing device 100 may further include a display unit and the like, which will not be described herein again. Specifically, in this embodiment, the processor 10 in the message processing device 100 loads the executable files corresponding to the processes of one or more application programs into the memory 20 according to the following instructions. The application programs stored in the memory 20 are executed by the processor 10, thereby realizing various functions. The processor 10 performs the following steps: Generate a request message, wherein the request message includes an attribute message and a content message, the content message includes a first type of content message and a second type of content message, the attribute message is used to process the request message; send the request message.

Those of ordinary skill in the art can understand that all or part of the steps in the various methods of the above embodiments may be completed by instructions, or by instructions to control related hardware. The instructions may be stored in a computer-readable storage medium and loaded and executed by a processor.

To this end, the embodiments of the present application provide a storage medium for storing program instructions. The program instructions are for execution by a processor to implement a method as described in any of the above. The storage medium may include: a read only memory (ROM), a random access memory (RAM), a magnetic disk or an optical disk, and the like. A computer program is stored thereon, the computer program is loaded by the processor to perform the steps: Generate a request message, wherein the request message includes an attribute message and a content message, the content message includes a first type of content message and a second type of content message, the attribute message is used to process the request message; send the request message.

In the above-mentioned embodiments, the description of each embodiment has its own emphasis. For parts that are not described in detail in a certain embodiment, reference may be made to the above detailed description of other embodiments, and details are not repeated here.

During specific implementation, the above units or structures can be implemented as independent entities or can be arbitrarily combined to implement as one or several entities. For the specific implementation of the above units or structures, reference may be made to the foregoing method embodiments, and details are not described herein again.

For the specific implementation of the above operations, reference may be made to the foregoing embodiments, and details are not described herein again.

The present application provides message encoding and decoding methods, processing device and a storage media including generating a request message, wherein the request message comprises an attribute message and a content message, the attribute message comprises a message identifier, a message direction, a message timeout state, a message processing state, and a message termination state, the content message comprises at least a first type of content message and a second type of content message, and the attribute message is used to process the request message; and sending at least the content message and the message direction in the request message. The request message in this application may include at least two different types of content messages. That is, two different types of content messages can be sent at one time. In addition, the attribute message in the request message can be used as the basis for processing the request message, which standardizes the way of processing the request message. Therefore, the message processing method of the present application can consider diversity and stability of the communication content form.

The message encoding method, the message decoding method, the message processing device, and the storage medium provided by the embodiments of the present application have been described in detail above. Specific examples are used herein to illustrate the principles and implementations of the present application. The descriptions of the above embodiments are only used to help understand the method and the core idea of the present application. In addition, for those skilled in the art, according to the idea of the present application, there will be changes in the specific embodiments and application scope. In conclusion, the content of this specification should not be construed as a limitation on the present application.

What is claimed is:

1. A message encoding method, comprising:
 generating a request message, wherein the request message comprises an attribute message and a content message, the attribute message comprises a message identifier, a message direction, a message timeout state, a message processing state, and a message termination state, the content message comprises at least a first type of content message and a second type of content message, and the attribute message is used to process the request message; and
 sending at least the content message and the message direction in the request message.

2. The message encoding method of claim 1, wherein generating the request message comprises:

acquiring and initializing an attribute message to be initialized to generate the attribute message, and the message direction in the attribute message is initialized from a message direction to be initialized to a request direction; and generating the request message according to the attribute message.

3. The message encoding method of claim 1, wherein after generating the request message, the method further comprises:

storing the request message in a message buffer area, wherein the message buffer area is configured to, according to at least one of the message timeout state, the message processing state, and the message termination state corresponding to the request message, determine whether to remove the request message.

4. The message encoding method of claim 3, wherein the message buffer area is configured to determine whether to remove the request message according to at least one of the message timeout state and the message processing state corresponding to the request message;

wherein after sending at least the content message and the message direction in the request message, the method further comprises:

acquiring at least one of the message termination state and the message timeout state corresponding to the request message, and removing the request message in the message buffer area according to whether the message termination status is terminated or the message timeout state is timeout.

5. The message encoding method of claim 4, wherein acquiring at least one of the message termination state and the message timeout state corresponding to the request message, and removing the request message in the message buffer area according to whether the message termination state is terminated or whether the message timeout state is timeout comprises:

acquiring and determining whether the message termination state corresponding to the request message is terminated;

if the message termination state is not terminated, acquire and determine whether the message timeout state corresponding to the request message is timeout; and if the message timeout state is timeout, the request message in the message buffer area is removed.

6. A message decoding method, comprising:

receiving a received message, wherein the received message comprises an attribute message and a content message, the attribute message comprises a message identifier, a message direction, a message timeout state, a message processing state, and a message termination state, the content message comprises at least a first type of content message and a second type of content message, and the attribute message is used to process the received message; and processing the received message at least according to the attribute message.

7. The message decoding method of claim 6, wherein before processing the received message at least according to the attribute message, the method comprises:

storing the received message in a message queue; and
fetching the received t message from the message queue.

8. The message decoding method of claim 7, wherein the message queue is a first-in, first-out queue.

9. The message decoding method of claim 7, wherein processing the received message at least according to the attribute message comprises:

determining whether the attribute message matches any one request message in the message buffer area; and if the attribute message matches the any one request message in the message buffer area, removing the request message matching the attribute message in the message buffer area.

10. The message decoding method of claim 9, wherein processing the received message at least according to the attribute message comprises:

determining whether the message identifier matches any one request message in the message buffer area; and if the message identifier matches the any one request message in the message buffer area, removing the received message in the message queue, and removing the request message matching the message identifier in the message buffer area.

11. The message decoding method of claim 10, wherein after determining whether the message identifier matches any one request message in the message buffer area, the method further comprises:

if the message identifier does not match the any one request message in the message buffer area, determining whether the message direction is a request direction; and if the message direction is the request direction, generating a reply message according to the received message, and removing the received message in the message queue.

12. The message decoding method of claim 7, wherein processing the received message at least according to the attribute message comprises:

determining whether the message direction is a request direction;

if the message direction is the request direction, generating a reply message according to the received message, and removing the received message in the message queue;

if the message direction is not the reply direction, determining whether the message identifier matches any one request message in the message buffer area; and if the message identifier matches the any one the request message in the message buffer area, removing the received message in the message queue, and removing the request message matching the message identifier in the message buffer area.

13. The message decoding method of claim 9, wherein the message buffer area is configured to determine whether to remove the request message according to at least one of the message timeout state, the message processing state, and the message termination state corresponding to the request message.

14. The message decoding method of claim 13, further comprising:

acquiring at least one of the message termination state and the message timeout state corresponding to the request message, and removing the request message in the message buffer area according to whether the message termination state is terminated or the message timeout state is timeout.

15. A message processing device, comprising:

a memory and a processor, wherein the memory is configured to store program instructions, and the processor is configured to execute the program instructions to implement a message encoding method, the message encoding method comprising:

generating a request message, wherein the request message comprises an attribute message and a content message, the attribute message comprises a message identifier, a message direction, a message timeout state, a message processing state, and a message termination state, the content message comprises at least a first type of content message and a second type of content message, and the attribute message is used to process the request message; and sending at least the content message and the message direction in the request message.

16. The message processing device of claim 15, wherein after generating the request message, the method further comprises:

storing the request message in a message buffer area, wherein the message buffer area is configured to, according to at least one of the message timeout state, the message processing state, and the message termination state corresponding to the request message, determine whether to remove the request message.

17. The message processing device of claim 15, wherein the processor is further configured to execute the program instructions to implement a message decoding method, the message decoding method comprising:

receiving a received message, wherein the received message comprises an attribute message and a content message, the attribute message comprises a message identifier, a message direction, a message timeout state, a message processing state, and a message termination state, the content message comprises at least a first type of content message and a second type of content message, and the attribute message is used to process the received message; and processing the received message at least according to the attribute message.

\* \* \* \* \*